July 8, 1941.  C. D. REED ET AL  2,248,119
METHOD AND APPARATUS FOR ASSEMBLING AND SHIPPING RODS
Filed April 21, 1938   10 Sheets-Sheet 3

Inventors
Claude D. Reed
and Robert L. Riley.
By P. S. A. Dougherty
Attorney

July 8, 1941.                C. D. REED ET AL                2,248,119
        METHOD AND APPARATUS FOR ASSEMBLING AND SHIPPING RODS
                Filed April 21, 1938        10 Sheets-Sheet 4

Inventors
Claude D. Reed and
Robert L. Riley.
By R. S. A. Dougherty
Attorney

July 8, 1941.   C. D. REED ET AL   2,248,119
METHOD AND APPARATUS FOR ASSEMBLING AND SHIPPING RODS
Filed April 21, 1938   10 Sheets-Sheet 5

Inventors
Claude D. Reed
and Robert L. Riley.
By R. S. A. Dougherty
Attorney July 8, 1941.   C. D. REED ET AL   2,248,119
METHOD AND APPARATUS FOR ASSEMBLING AND SHIPPING RODS
Filed April 21, 1938   10 Sheets-Sheet 6

Inventors
Claude D. Reed
and Robert L. Riley.
By R. S. C. Dougherty
Attorney

July 8, 1941.  C. D. REED ET AL  2,248,119
METHOD AND APPARATUS FOR ASSEMBLING AND SHIPPING RODS
Filed April 21, 1938  10 Sheets-Sheet 7

Inventors
Claude D. Reed
and Robert L. Riley.
By R. S. C. Dougherty
Attorney

July 8, 1941.  C. D. REED ET AL  2,248,119
METHOD AND APPARATUS FOR ASSEMBLING AND SHIPPING RODS
Filed April 21, 1938　　10 Sheets-Sheet 8

Inventors
Claude D. Reed and
Robert L. Riley.
By R. S. A. Dougherty.
Attorney

July 8, 1941.  C. D. REED ET AL  2,248,119
METHOD AND APPARATUS FOR ASSEMBLING AND SHIPPING RODS
Filed April 21, 1938  10 Sheets-Sheet 10

Inventors
Claude D. Reed
and Robert L. Riley.
By R. S. A. Dougherty
Attorney

Patented July 8, 1941

2,248,119

UNITED STATES PATENT OFFICE 2,248,119

METHOD AND APPARATUS FOR ASSEMBLING AND SHIPPING RODS

Claude D. Reed and Robert L. Riley, Lebanon, Pa., assignors to Bethlehem Steel Company, a corporation of Pennsylvania Application April 21, 1938, Serial No. 203,306

23 Claims. (Cl. 105—367)

This invention relates to a method and apparatus for crating, loading and transporting merchandise such as rods or the like, and more particularly to the packing and shipping sucker rods used in oil wells.

Where oil wells are sunk to a great depth, sometimes exceeding a mile it is customary to pump oil out of such wells through pump tubes having foot valves; suckers being operated in the tubes for that purpose by means of rods which are made in sections joined together by couplings, so as to extend from near the bottom of its pump tube to above the surface of the ground. The length of each of these rod sections is usually about twenty-five feet and they have to be perfectly straight and free from surface marks, otherwise they are liable to snap off during the pumping operation, in which the rod reciprocates through a zone from three to six feet or more in the well tube. The breakage of a sucker rod in the well tube is a serious matter as it becomes necessary to raise the broken sections so they can be replaced by a new section and recoupled together, consequently the cost is high both in rod replacement and because of the fact that wells are inactive while the rod sections are being changed. Furthermore, it is necessary that the threaded ends of the sucker rod sections should be fully protected at all times during the shipping operation and handling, otherwise difficulty in assembling may be experienced or the threads at the coupling joints might fail during the pumping operation, which would entail the same expense as the breakage of one of the rod sections in the well tube.

Sucker rods on account of their enlarged end portions and the couplings and caps for protecting the said threaded ends cannot be shipped loose or bundled directly together as the intermediate portions of the rods would become bent or twisted during shipment or handling.

One of the objects of this invention relates to the assembling and securing a plurality of rods together in bundles at spaced intervals so they will be held perfectly straight with the ends and intermediate portions in spaced relation to each other in such a manner as to obviate scratches and abrasions and prevent relative longitudinal and lateral movement of the rods in the bundle, during shipment.

Another object of the invention relates to the means for assembling and securing together the spacing blocks for the individual bundles.

A further object of the invention relates to the lifting devices by means of which each individual bundle is engaged and transferred to a vehicle such as railroad car or the like for shipment, and the manner of operating the arms by means of which each individual sucker rod in the bundle can be simultaneously engaged or disengaged thereby.

Another object of the invention relates to the manner of assembling and securing a plurality of the bundles together to form a unitary bundle, in which the individual bundles are held against relative movement in relation to each other.

Still another object of the invention relates to the construction of the base support or pallet for the unitary bundle so as to allow for a longitudinal sliding movement of the unitary bundle on a car floor or the like during shipment.

With the foregoing and other objects in view, the invention will be more fully described hereinafter, and will be more particularly pointed out in the claims appended.

Referring now to the accompanying ten sheets of drawings which form a part of this specification and on which like characters of reference indicate like parts.

Figure 9:
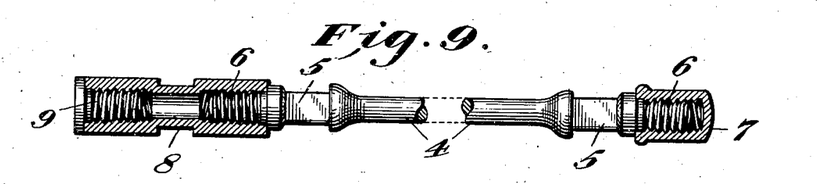
Fig. 9 is a detail view illustrating the manner of protecting the threaded ends of the sucker rods during shipment.
Figure 10:
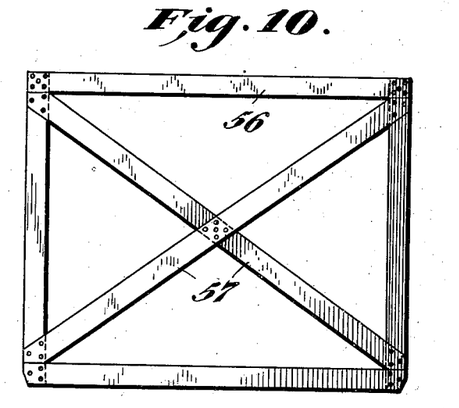
Fig. 10 is a front elevation of the intermediate spacing frame members for the crate.
Figure 11:
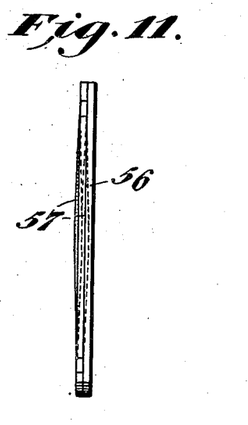
Fig. 11 is an edge view of Fig. 10.
Figure 12:
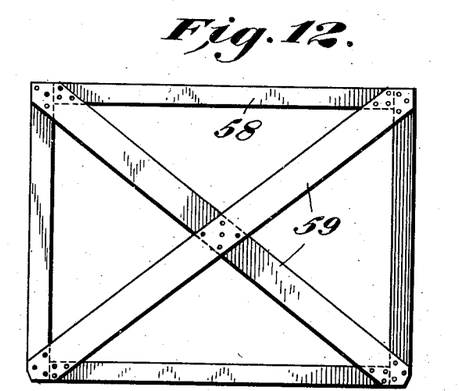
Fig. 12 is a front elevation of one of the side frame members for the crate.
Figure 13:
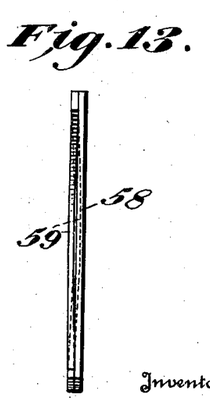
Fig. 13 is an edge view of Fig. 12.
Figures 14, 15:
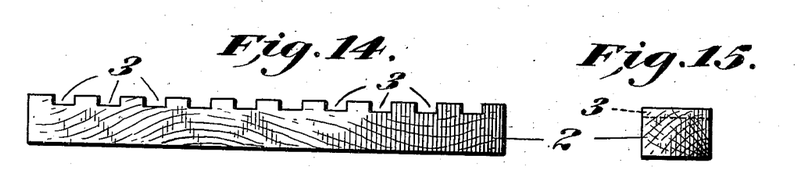
Fig. 14 is a side elevation of one of the spacing blocks for holding the sucker rods in the bundles in position.
Fig. 15 is an end elevation of the spacing block shown in Fig. 14.
Figures 16, 17:
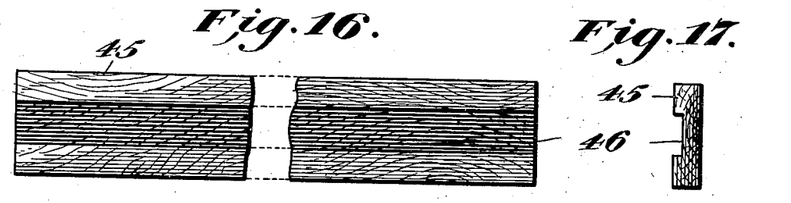
Fig. 16 is a top plan of one of the base support members for the unitary bundle.
Fig. 17 is an end elevation of the base support member shown in Fig. 16.
Figure 18:
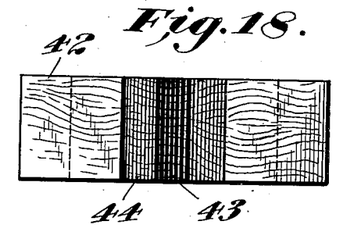
Fig. 18 is a top plan view of one of the skids.
Figure 19:
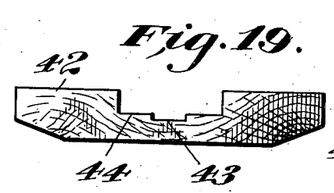
Fig. 19 is a side elevation of the skid shown in Fig. 18.

Referring now to the various characters of reference on the drawings:

The numeral 1 indicates a bundle of sucker rods, and 2 a plurality of wooden spacing blocks vertically arranged in sets each having kerfs or notches 3, the contour of which may be rectangular, V-shaped or curved, cut in one side in spaced relation to each other for receiving the sucker rods 4. As shown in Fig. 9 the sucker rods are provided with a squared portion near their ends as at 5 for engaging a tool for holding the same and the ends are threaded as at 6. One end of which is protected during shipment by means of a cap 7, and the opposite end by means of a coupling 8, having its outer end closed by a plug 9.

For illustration we have shown each bundle of rods with five vertically arranged sets of spacing blocks but this number of sets of spacing blocks may be varied if desired.

Figure 20:
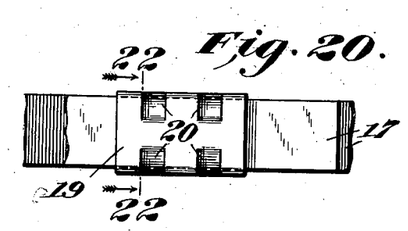
Fig. 20 is a top plan view drawn on a larger scale illustrating the manner of sealing or securing the ends of the straps together.
Figure 24:
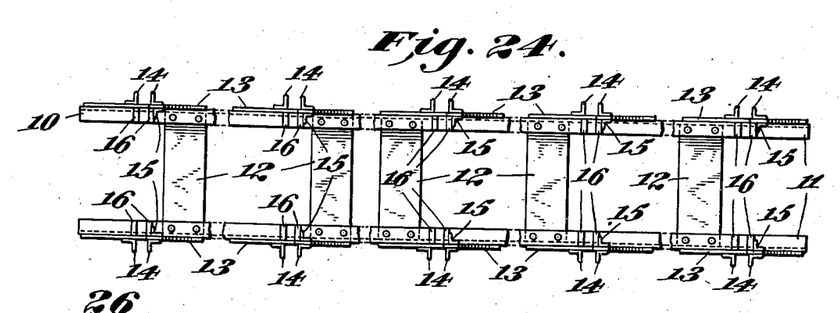
Fig. 24 is a top plan view of the bundle assembling rack.
Figures 25, 26:
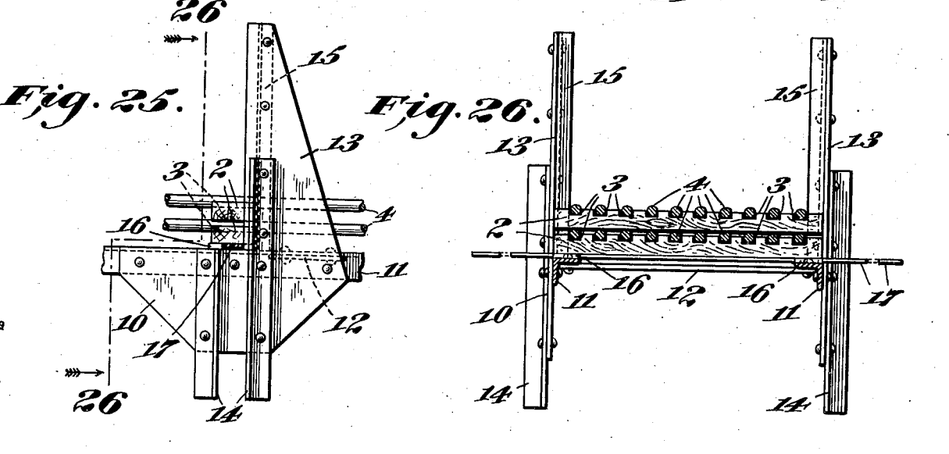
Fig. 25 is a side elevation of one of the guiding brackets of the assembling rack for holding the spacing blocks during the formation of the bundle, but drawn on a larger scale.
Fig. 26 is a transverse section through the assembling rack taken on the line 26—26 of Fig. 25.

In the formation of each bundle an assembling rack 10 shown in Figs. 24 to 26 inclusive is used comprising longitudinally extending side frame angles 11, connected at spaced intervals by means of transverse plates 12, having five sets of side guide brackets 13, reinforced on their outer sides by means of vertically extending angles 14, and on the inside by vertical angular guides 15, for engaging one side of the ends of the sets of spacing blocks 2 during the formation of the bundle. A pair of spaced flat plates 16 are welded to the tops of each side angle 11, adjacent to each angular guide between which straps 17 are inserted before the bottom spacing block for each set are placed in the assembling rack 10. The bottom spacing blocks for each set with their kerfs uppermost are then inserted in position above each of the straps 17 and pairs of spaced flat plates 16, with their side ends engaging the vertical angular guides 15, as indicated in Figs. 25 and 26. An operator at opposite ends of the assembling rack then inserts a horizontal row of sucker rods in the kerfs 3, and then adds another spacing block above each bottom block with their kerfs uppermost and assemble another horizontal row of sucker rods 4. This operation is repeated until the desired number of horizontal rows of rods is obtained. A top spacing block is then placed over the top of each set of spacing blocks, which may be a plain block without kerfs or one with its kerfs 3 extending downwardly. The spacing blocks 2 are all duplicates and for illustration are each formed with ten kerfs which are substantially the same width as each sucker rod and about half the depth of the same and all spaced an equal distance apart and arranged to form a bundle comprising eight horizontal rows of sucker rods of ten each. When this bundle of eighty rods has been assembled, bent metal angle pieces 18 are placed over the upper and lower corners of the assembled top and bottom spacing blocks of each set and the ends of the straps 17 are then brought up over the tops of the sets of spacing blocks and a sealing joint 19 inserted thereon, the ends of the straps are then stretched by means of a suitable machine for this purpose and the seals crimped by slitting the opposite side edges as at 20 and bending a portion downwardly as indicated more clearly in Figs. 20 and 22. The straps 17 are further secured to the top spacing blocks by means of staples 21.

After the individual bundles have been assembled and bound by means of straps they are hoisted by means of a traveling crane and a pair of lifting devices and transported to a car or like vehicle, and a plurality of the individual bundles are then assembled and crated to form a unitary bundle in the following manner.

Figure 27:
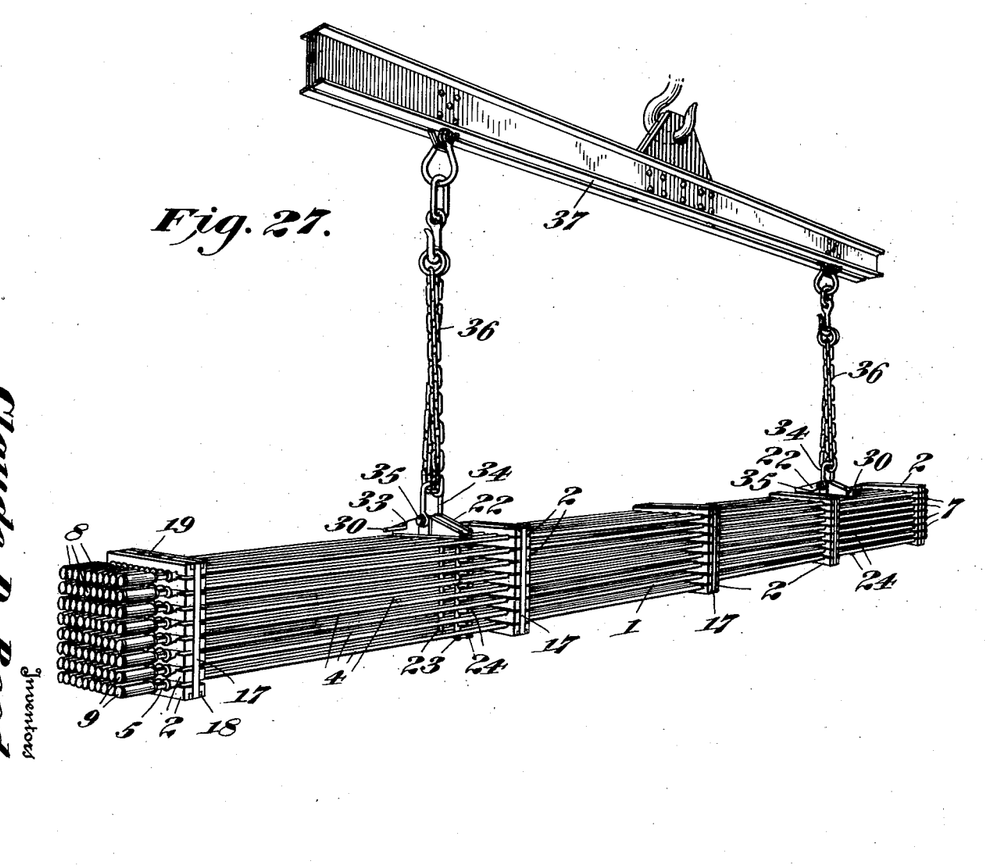
Fig. 27 is a perspective view illustrating the manner of conveying the individual bundles in forming the unitary bundle.
Figure 28:
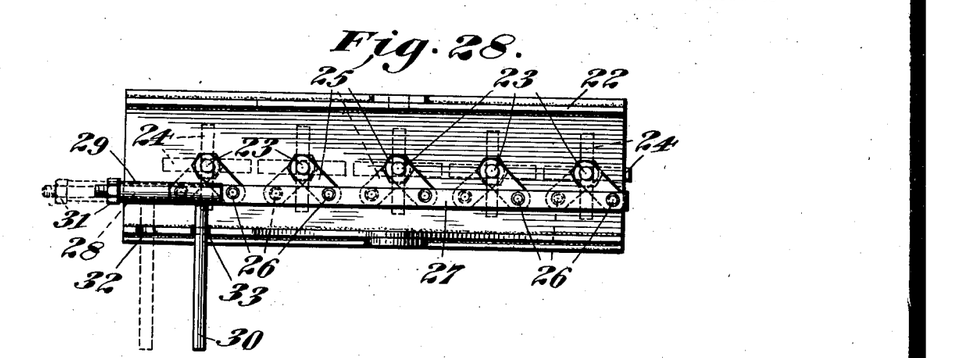
Fig. 28 is a top plan view of one of the bundle lifting devices and Fig. 29 is an elevation of one of the lifting devices showing the sucker rods of a bundle in section with an arm engaging each rod as they would appear in the act of conveying a bundle.
Figure 29:
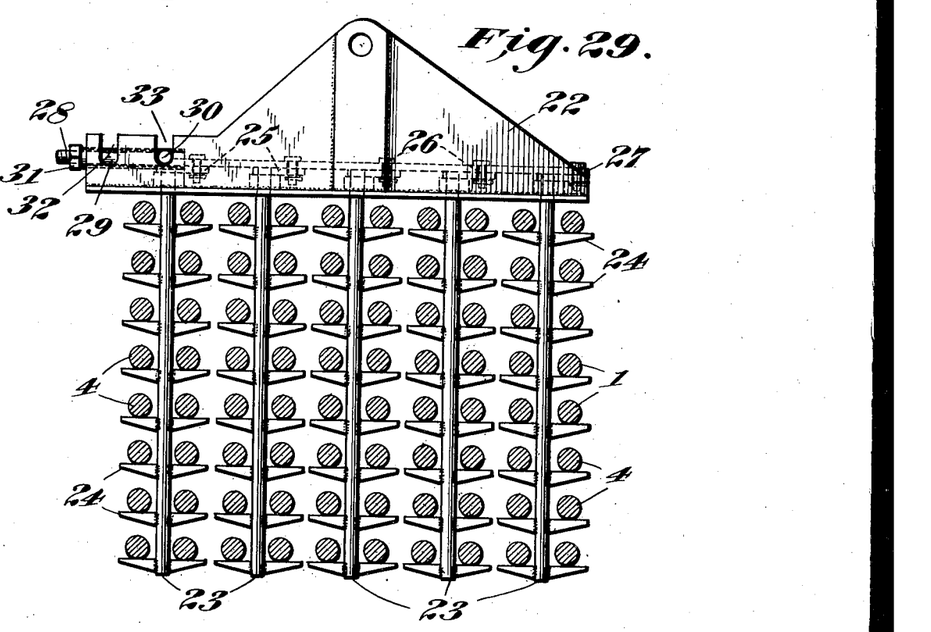

A lifting device is adapted to engage each end portion of the individual bundles, each having a U-shaped head frame 22 for supporting a plurality of downwardly extending spaced shafts 23 provided with laterally oppositely extending arms 24. Each downwardly extending shaft 23 is adapted to extend between two vertical rows of sucker rods and to be rotated a quarter of a revolution, so that an arm 24 will extend under each sucker rod as indicated in Fig. 29 or to be rotated a quarter of a revolution in the reverse direction to disengage the lifting device from the bundle. In order to rotate all the shafts 23 simultaneously a lever 25 is attached to the upper end of each shaft and pivoted as at 26 to a shifting bar 27 provided with a cylindrical end portion 28 upon which is rotatably mounted the tubular end 29 of a handle 30 and secured thereto by means of a nut 31. Notches 32 and 33 are formed in one edge of the side wall of the head frame 22 for holding the handle 30 and spaced shafts 23 in the desired shifted position. As indicated in Fig. 27 a bail 34 is pivoted by means of a bolt 35 to the central portion of each of the upwardly extending legs of the U-shaped head frame 22 for receiving chains 36 which extend to a lifting bar 37 which is adapted to be supported by means of a traveling crane (not shown).

Figure 1:
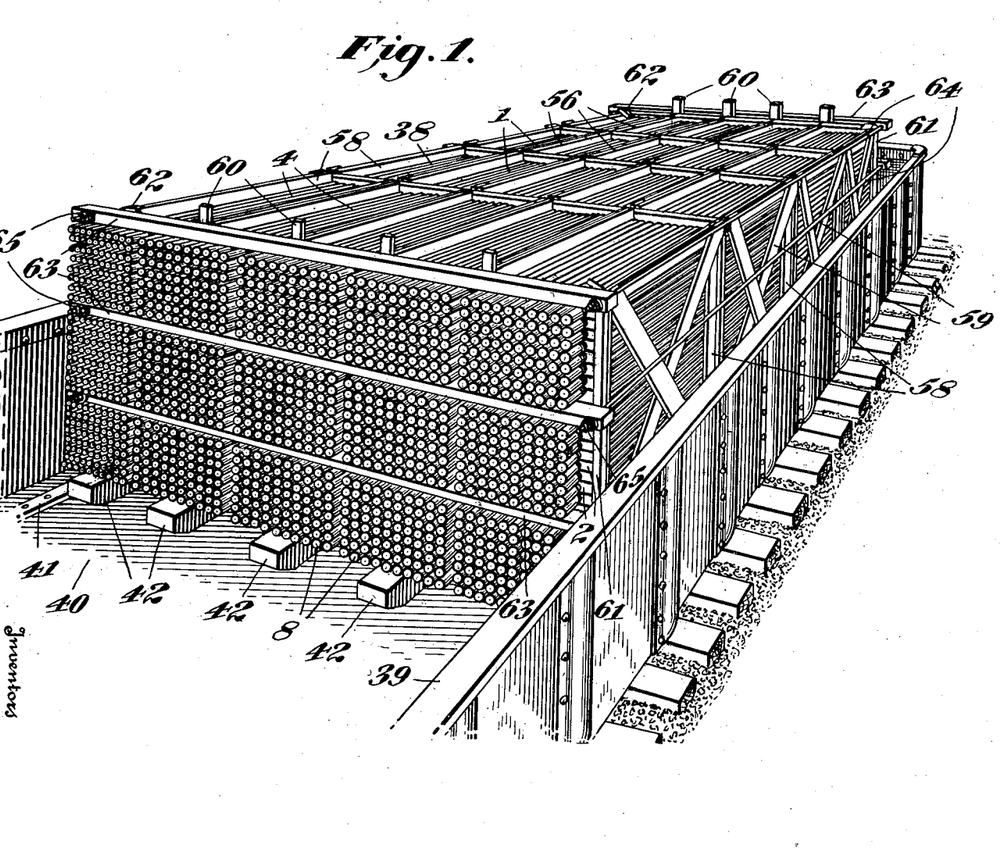
Figure 1 is a perspective view showing a unitary bundle mounted in a freight car as it would appear ready for shipment.
Figure 2:
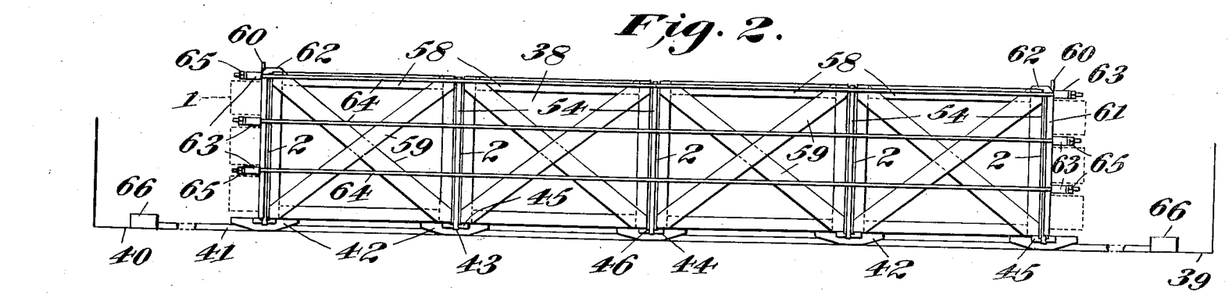
Fig. 2 is a side elevation of the assembled crate for the unitary bundle as it would appear mounted in a freight car, with the area occupied by the ends of the sucker rods indicated in dotted lines.
Figure 3:
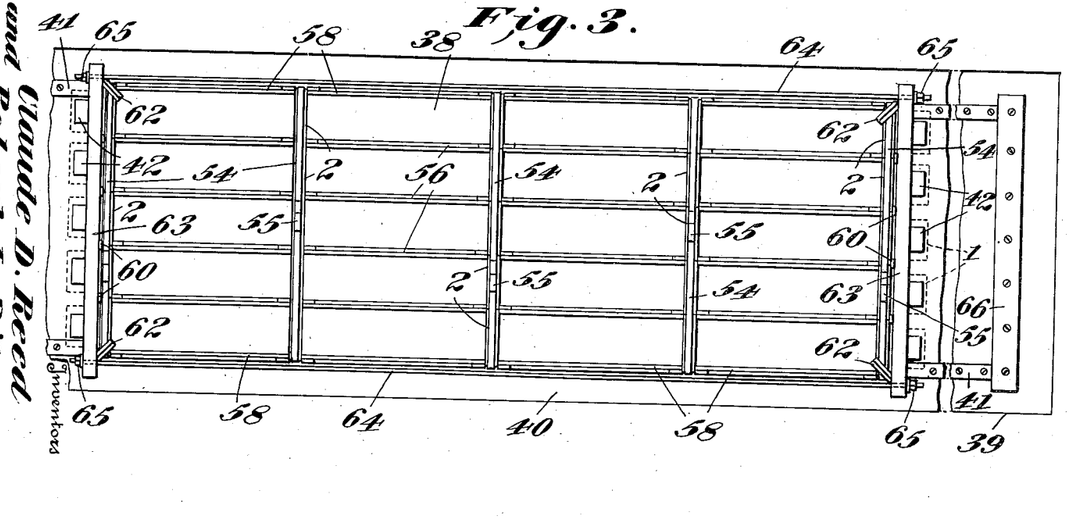
Fig. 3 is a top plan view of the crate as shown in Fig. 2.
Figure 4:
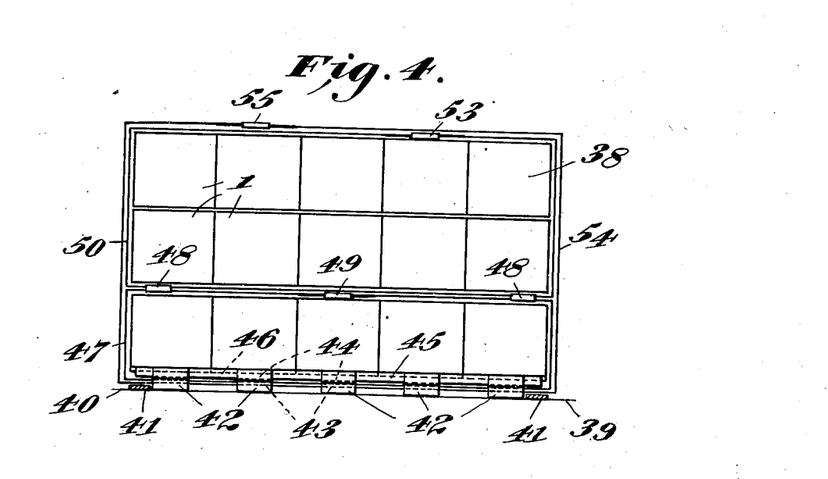
Fig. 4 is a diagrammatic view showing the arrangement of the tying straps for the central and end portions of the unitary bundle.
Figure 5:
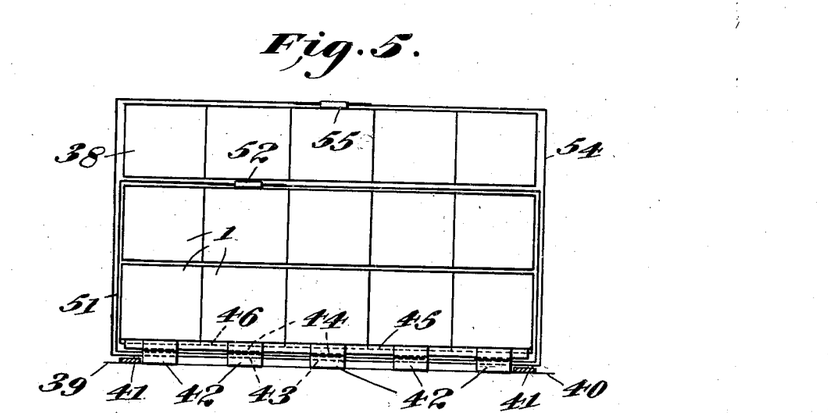
Fig. 5 is a diagrammatic view showing the arrangement of the tying straps for the intermediate portions between the central and end portions of the unitary bundle.
Figure 6:
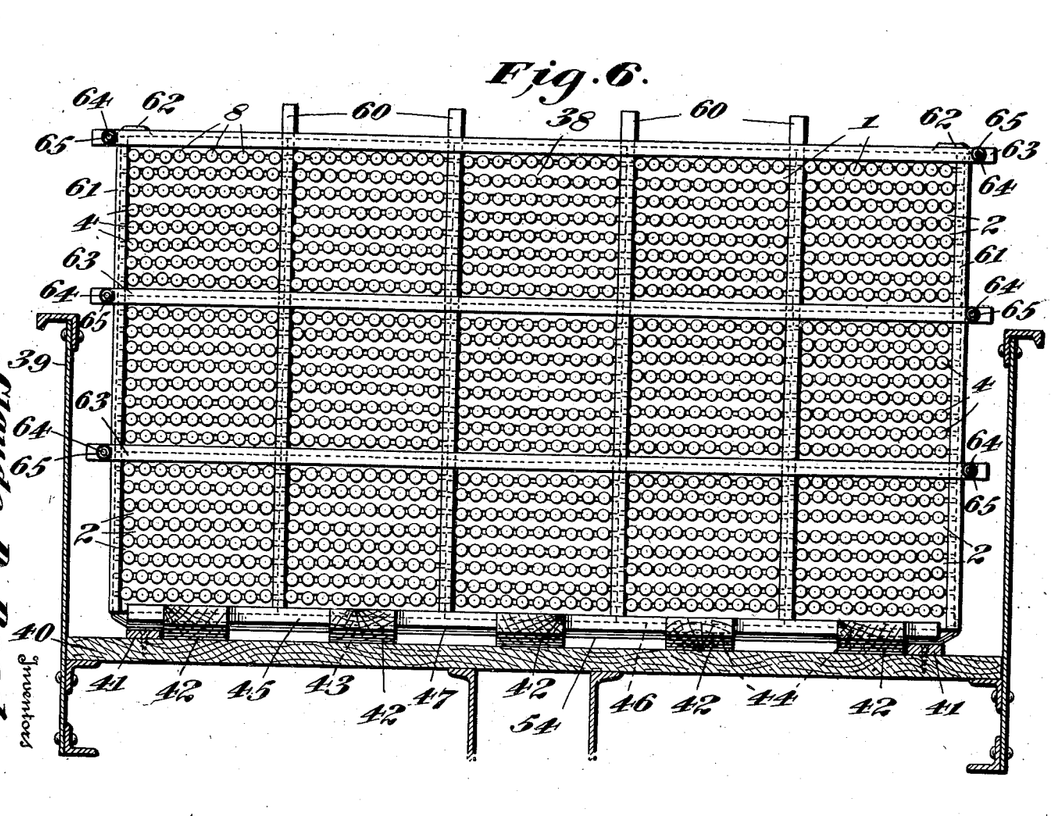
Fig. 6 is an end elevation of the unitary bundle drawn on a larger scale and mounted in a freight car.
Figure 7:
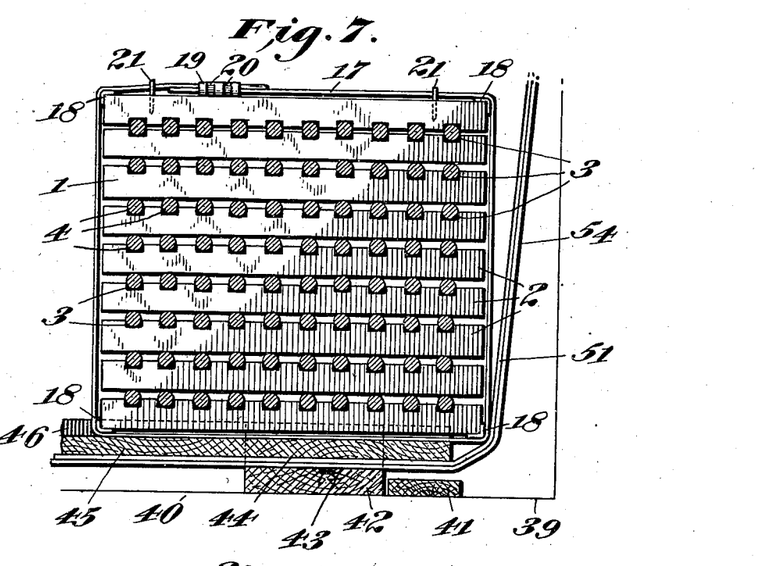
Fig. 7 is a transverse section through one of the bundles taken near the spacing blocks on the line 7—7 of Fig. 8 with a portion of one of the transverse base supports and one of the skids in section mounted in a car.
Figure 8:
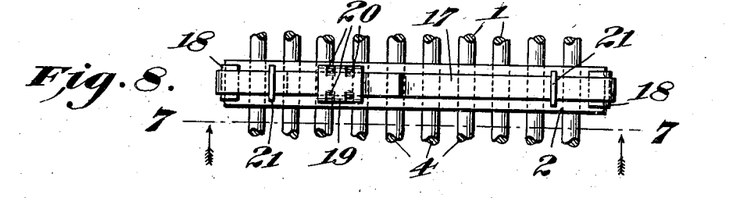
Fig. 8 is a top plan view of a portion of a bundle showing the manner of tying the spacing blocks in forming the individual bundles.
Figure 21:
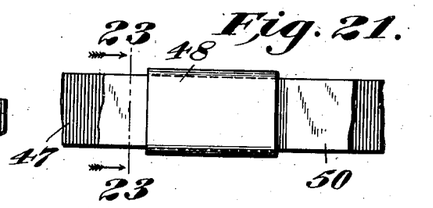
Fig. 21 is a top plan view illustrating the manner of connecting one strap to another as indicated in Fig. 4.
Figure 22:
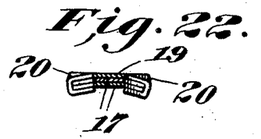
Fig. 22 is a transverse section through the sealed or secured ends of one of the tying straps taken on the line 22—22 of Fig. 20.
Figure 23:
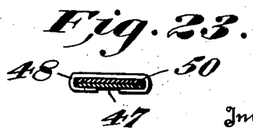
Fig. 23 is a transverse section through a pair of straps connected together taken on the line 23—23 of Fig. 21.

As illustrated in the drawings the unitary bundle 38 is assembled and crated in a gondola railroad car 39 having a wooden floor 40 near the opposite top sides of which a longitudinally extending guide bar 41 is nailed or secured in any approved manner adapted to guide the longitudinal movement of the unitary bundle on the car floor. Beneath the sets of spacing blocks 2, a plurality of transversely aligned skids 42 are disposed on the intermediate portion of the car floor recessed centrally as at 43 for the binding straps and grooved as at 44 for receiving the connecting bundle supporting bars 45 each grooved centrally on their top surfaces as at 46 in which is seated the bottom spacing blocks 2 of the lower row of the individual bundles. Before starting to assemble the unitary bundle in the car, pairs of straps are inserted in the recesses 43 of each of the row of skids 42. Five individual bundles 1 are then assembled side by side on the supporting bars 45 with the bottom spacing blocks 2 seated in the grooves 46 with a skid 42 beneath the central portion of each set of said spacing blocks. The upper strap 47 is then passed around the lower row of individual bundles in alignment with the two end and central sets of spacing blocks. As indicated in Figs. 4, 21 and 22, links 48 are then slid on the top portions of the straps 47 at each side thereof and the ends are then connected together by means of a seal as at 49, in a similar manner to that indicated in Figs. 20 and 22. A strap 50 is then connected to each of the straps 47 by means of the links 48 and another row of five individual bundles are then laid on top of the lower row of bundles. The upper straps 51 in line with the intermediate sets of spacing blocks are then passed over the tops of the central rows of intermediate bundles and sealed at 52 as indicated in Fig. 5. An additional row of five bundles is now laid on top of the central row, the three straps 50 connected to the straps 47 by means of links 48 are then passed over the top row of bundles and sealed at 53 as indicated in Fig. 4, and then the lower straps 54 in alignment with all of the sets of spacing blocks are wrapped around the entire bundle and sealed as at 55.

The assembled unitary bundle 38 is then created by first inserting a rectangular spacing frame 56 of a double thickness having X-shaped braces 57 at intermediate points between the vertical rows of bundles and the meeting ends of the spacing blocks 2. Rectangular side frames 58 of single thickness having X-shaped braces 59 are then inserted between the ends of the sets of spacing blocks at the sides of the unitary bundle. A flat bar 60 is then inserted at the meeting edges of the spacing blocks between each vertical row at the ends of the unitary bundle each having its lower ends resting on the bundle supporting bars 45, while the vertical corners of the unitary bundle are each protected by means of an angle 61 which are bent over at the top as at 62 to support them in position and prevent them from engaging the car floor. Wooden timbers forming clamping members 63 are then inserted between opposite ends of each of the longitudinal rows of bundles and over the ends of the top row of the individual bundles. The ends of the clamping members 63 extend beyond the sides of the unitary bundle and are perforated to receive the threaded ends of clamping rods 64 having nuts 65 threaded thereon for securely clamping the parts together as indicated in Figs. 1, 2, 3 and 6 of the drawings.

The unitary bundle 38 is assembled on the central portion of the car floor and when the car is under impact is free to slide as a unit longitudinally a short distance in either direction on the car floor thereby preventing damage to the car and unitary bundle as by actual experience has been found to be the case when the bundle is anchored to the car. Stops in the form of transversely extending wooden beams 66 are secured to the car floor near the ends of the car to prevent excessive travel of the unitary bundle on the car floor under extreme or abnormal conditions.

Although we have shown and described our invention in considerable detail, we do not wish to be limited to the exact and specific details shown and described, but may use such substitutions, modifications or equivalents thereof, as are embraced within the scope of our invention, or as pointed out in the claims.

Having thus described our invention, what we claim as new and desire to secure by Letters Patent is:

1. The method of assembling rods for shipment, which consists in arranging the rods in vertical and longitudinal rows, in uniform spaced parallel relation in kerfs formed in vertically aligned sets of blocks, binding each set of blocks together on the rods to form individual bundles, assembling a plurality of the individual bundles together in parallel relation, and then binding the individual bundles together to form a unitary bundle.

2. The method of assembling rods in a car for transportation which consists in arranging a plurality of transversely aligned sets of skids on the car floor, each set connected by a supporting bar, binding a plurality of rods together in spaced parallel alignment to form an individual bundle, depositing a plurality of the individual bundles on the supporting bars on the car floor, and then binding a plurality of the individual bundles together in parallel relation to form a unitary bundle.

3. The method of assembling rods on the floor of a freight car for transportation, consisting in binding a plurality of the rods together in spaced parallel relation to form individual bundles, securing the individual bundles together to form a unitary bundle and supporting it by means interposed between the unitary bundle and the car floor to permit movement of the unitary bundle as a unit on the car floor when the car is subjected to impact in transit.

4. The method of assembling rods on movable supports on the floor of a freight car or the like for transportation, consisting in binding a plurality of the rods together in spaced parallel relation to form individual bundles, arranging a plurality of the individual bundles together in parallel relation to form a unitary bundle to allow movement as a unit on the car floor and then guiding the unitary bundle in its movement on the car floor.

5. The method of assembling rods on the floor of a car or the like for transportation, consisting in securing a plurality of rods together in spaced parallel relation between a plurality of sets of vertically aligned spacing blocks to form an individual bundle, binding a plurality of individual bundles together to form a unitary bundle, mounting the unitary bundle on transversely extending bars each provided with skids engaging and adapted to travel on the car floor, and guiding the longitudinal movement of the skids and unitary bundle as a unit on the car floor when the car is subjected to shocks or blows in transit.

6. The method of assembling rods having enlarged end portions on the floor of a car or the like for transportation, consisting in binding a plurality of rods together in spaced parallel relation between a plurality of vertically aligned sets of spacing blocks formed in duplicate having kerfs therein to form an individual bundle, mounting a plurality of the individual bundles on transversely extending bars each provided with a plurality of skids engaging and adapted to travel on the car floor, binding a plurality of the individual bundles together to form a unitary bundle, inserting spacing frames vertically between the sets of spacing blocks of the bundles, and clamping the unitary bundle together.

7. The method of assembling rods having enlarged end portions on the floor of a car or the like for transportation, consisting in binding a plurality of rods together in spaced relation between a plurality of vertically aligned sets of spacing blocks formed in duplicate having kerfs formed therein for receiving the rods to form individual bundles, mounting a plurality of the individual bundles on transversely extending supporting bars each provided with a plurality of skids engaging and adapted to travel on the car floor, binding a plurality of the individual bundles together in vertical and longitudinal rows to form a unitary bundle, inserting vertically spacing frames at the longitudinal sides and between the vertical rows of bundles and the sets of spacing blocks, and clamping the ends of the unitary bundle together.

8. The method of assembling rods of uniform size on the floor of a car or the like for transportation, consisting in binding a plurality of rods together in spaced relation between a plurality of vertically aligned sets of spacing blocks having kerfs formed therein for receiving the rods to form individual bundles, assembling a plurality of the individual bundles in horizontal and vertical rows in parallel relation to each other on transversely extending supporting bars each provided with a plurality of skids engaging and adapted to travel on the car floor, binding the supporting bars and the individual bundles together to form a unitary bundle, inserting spacing frames at the sides between the vertical rows of bundles and the aligned sets of spacing blocks, and clamping the ends of the unitary bundle together.

9. The method of assembling rods on the floor of a freight car for transportation, which consists in arranging the rods in spaced parallel relation in kerfs formed in a plurality of vertically aligned sets of blocks formed in duplicate, binding each set of blocks together on the rods to form individual bundles, mounting a lower horizontal row of individual bundles in parallel relation on movable supporting means on the car floor, binding the horizontal row of bundles and the supporting means together, superimposing a plurality of horizontal rows of individual bundles on the lower row of bundles, and binding the horizontal rows of bundles together to form a unitary bundle.

10. In apparatus of the class described, comprising a plurality of skids arranged in rows transversely on the car floor, a supporting bar connecting each transverse row of skids, and a bundle of rods of uniform size bound together in spaced relation to each other mounted on the supporting bars and secured thereto.

11. In apparatus of the class described, comprising a plurality of skids arranged in rows transversely on a car floor, a groove in each skid, a supporting bar seated in the grooves of the skids for connecting each transverse row of skids, a bundle of rods having sets of vertically arranged blocks with kerfs formed therein for holding the rods in spaced relation, means for binding the sets of spacing blocks together, and a groove in each supporting bar seating the lower edge of each set of vertically arranged blocks.

12. In apparatus of the class described, comprising a plurality of skids arranged in rows transversely on a car floor, a supporting bar connecting each row of skids, a plurality of longitudinally extending vertical and horizontal rows of individual bundles of rods seated on the supporting bars, means for securing the rods in each bundle in parallel spaced relation, and means for securing the individual bundles together to form a unitary bundle.

13. In apparatus of the class described, comprising a plurality of skids arranged in rows transversely on a car floor, a groove formed in each skid, a supporting bar seated in the grooves for connecting each row of skids, a recess formed in each skid below the supporting bars, a pair of straps extending through the recesses in each row of skids, a bottom row of individual bundles mounted on the supporting bars adapted to be bound together at the central and end portions of the bundles by one of each pair of straps, links for attaching a strap to each of the bound straps, a superimposed row of individual bundles on the bottom row of bundles, straps for binding the two rows of bundles together at intermediate points between the central and end portions, a superimposed top row of individual bundles thereon, and means for securing the superimposed rows of individual bundles together to form a unitary bundle.

14. In apparatus of the class described, comprising a plurality of skids arranged in rows transversely on the car floor, a supporting bar connecting each row of skids, a plurality of horizontal rows of superimposed individual bundles of rods mounted on the supporting bars, each of said bundles having a plurality of sets of vertically disposed blocks with kerfs formed therein for holding the rods in spaced parallel relation, straps for binding the lower horizontal row of bundles together, straps for binding each of the superimposed rows of bundles thereto, and straps for binding all of the individual bundles together to form a unitary bundle.

15. In apparatus of the class described, comprising a plurality of skids arranged in rows transversely on the car floor, a groove in the upper surface of each skid, a supporting bar having a longitudinal groove in its upper face connecting each row of skids, a recess in each skid below the supporting bars, a pair of straps extending through the recess in each row of skids, a plurality of superimposed horizontal rows of individual bundles of rods, each of said bundles having a plurality of sets of vertically disposed blocks with kerfs formed therein for holding the rods in spaced parallel relation, each set of blocks extending beyond the sides of the bundles and bound together by means of a strap, straps for binding the lower horizontal row of individual bundles together, and straps for binding each row of superimposed individual bundles to the lower row of bundles.

16. An apparatus for transporting metal rods in a unitary bundle on the floor of a freight car, comprising a plurality of transversely extending supporting bars, skids for the supporting bars engaging the car floor, a plurality of individual bundles of rods bound together in horizontal longitudinally extending superimposed rows, a series of sets of blocks arranged transversely in alignment with each other in each individual bundle, kerfs in the blocks for holding the rods in spaced parallel relation, and means for binding each of the sets of blocks together.

17. An apparatus for transporting metal bars in a unitary bundle on the floor of a freight car or the like, comprising a plurality of supporting bars arranged transversely of the car, each mounted on skids engaging the car floor, a plurality of individual bundles of rods arranged longitudinally in vertical and horizontal rows and bound together in parallel relation and mounted on the supporting bars and secured thereto, a series of sets of blocks each arranged transversely and extending beyond the lateral sides of each individual bundle to form a squared edge to engage the squared edges of the sets of blocks in the adjacent bundles, kerfs formed in the sets of blocks for holding the rods in spaced parallel relation, and a strap for binding each of the sets of blocks together.

18. An apparatus for transporting metal rods in a unitary bundle on the floor of a freight car or the like, comprising a plurality of supporting bars arranged transversely of the car and seated in skids engaging the car floor, a plurality of individual bundles of rods arranged parallel to each other to form vertical and horizontal rows mounted on the supporting bars, a series of sets of blocks interposed between adjacent horizontal layers of rods each arranged transversely and extending beyond the lateral sides of each of the individual bundles to form a squared edge to engage the squared edges of the sets of blocks in the adjacent bundles, kerfs formed in each block for holding the rods in spaced relation, a strap for binding each of the sets of blocks together, and straps extending through the skids and under the supporting bars in alignment with each of the sets of blocks for binding the unitary bundle to the supporting bars.

19. An apparatus for transporting metal rods, a plurality of skids arranged in rows transversely on a car floor, a supporting bar connecting each transverse row of skids, a plurality of individual bundles arranged longitudinally of the car in vertical and horizontal rows in parallel relation to each other on the supporting bars, a series of sets of blocks each set arranged in relative transverse alignment in each of the individual bundles and mounted on one of the supporting bars, a groove formed in the upper surface of each supporting bar for receiving the lower portion of each set of blocks in the lower horizontal row of bundles, kerfs formed in each block for holding the rods in spaced relation, a strap for binding each set of blocks in each bundle together, and a strap extending through each row of skids beneath each supporting bar for binding the supporting bars and the individual bundles together to form a unitary bundle.

20. An apparatus for transporting metal rods, a plurality of skids arranged in rows transversely on a car floor or the like, a supporting bar connecting each transverse row of skids, a plurality of individual bundles arranged longitudinally of the car in horizontal and vertical rows in parallel relation to each other, a series of sets of blocks in each bundle, each set arranged in alignment to the sets of blocks in the adjacent bundles and one of the supporting bars, a groove formed in the upper surface of each supporting bar for receiving the lower portion of each set of blocks for the lower horizontal row of bundles, notches formed in each of the blocks for holding the rods in spaced relation, means for binding each set of blocks in each individual bundle together, a strap extending through each row of skids beneath each supporting bar for binding the supporting bars and the individual bundles together to form a unitary bundle, side and intermediate frames between the sets of blocks, vertically extending bars at the corners and between the vertical rows of individual bundles at opposite ends of the unitary bundle, clamping members at the top and between the horizontally arranged rows of bundles at opposite ends of the unitary bundle engaging the vertically extending bars, and longitudinally extending clamping rods at the sides of the unitary bundle for connecting the ends of the clamping members.

21. A commercial package composed of a bundle of rods having enlarged end portions, sets of vertically aligned wooden blocks at a plurality of points along the bundle having kerfs formed therein in one surface for holding the rods in the bundle in uniform parallel spaced relation to each other, a strap stretched around each vertically arranged set of blocks for holding the blocks in clamped relation on the rods, and means for sealing the ends of the straps.

22. A commercial package composed of individual bundles of rods having enlarged end portions arranged in parallel relation, blocks of uniform size having kerfs formed therein arranged in vertically aligned sets at a plurality of points along each bundle for holding the rods in spaced relation to each other, means for clamping the sets of blocks on the rods, and means for binding the individual bundles together, to form a unitary bundle.

23. A commercial package composed of a plurality of individual bundles of rods arranged in parallel relation, sets of transversely aligned blocks arranged vertically at a plurality of points along the bundles, kerfs formed in spaced relation in one surface of each block for holding the rods in vertical and longitudinally aligned rows in uniform spaced parallel relation to each other, means for holding the sets of blocks in clamped relation on the rods in each bundle, supporting bars for the bundles, and means for binding the supporting bars and the individual bundles together to form a unitary bundle.

CLAUDE D. REED.
ROBERT L. RILEY.